United States Patent [19]
Christensen et al.

[11] Patent Number: 6,148,064
[45] Date of Patent: Nov. 14, 2000

[54] METHOD AND APPARATUS FOR ALERTING A COMMUNICATION UNIT IN A COMMUNICATION SYSTEM

[75] Inventors: Laura A. Christensen, Mt. Prospect; Kamala D. Urs, Bartlett; Anatoly S. Belkin, Mt. Prospect; Robert L. Epsom, Inverness; Jay R. Krebs, Crystal Lake; Sikendar Fidai, South Barrington, all of Ill.

[73] Assignee: Motorola, Inc., Schaumburg, Ill.

[21] Appl. No.: 09/208,783

[22] Filed: Dec. 10, 1998

[51] Int. Cl.[7] ........................................ H04Q 7/28
[52] U.S. Cl. ...................... 379/88.12; 379/88.15; 455/413
[58] Field of Search .................... 379/88.12, 88.15, 379/372, 373, 376; 455/31.1, 31.2, 31.3, 38.2, 38.4, 412, 413, 414, 417, 517

[56] References Cited

U.S. PATENT DOCUMENTS

| | | |
|---|---|---|
| 4,942,598 | 7/1990 | Davis . |
| 5,327,486 | 7/1994 | Wolff et al. . |
| 5,802,466 | 9/1998 | Gallant et al. ........................ 455/413 |
| 5,928,325 | 7/1999 | Shaughnessy et al. ............... 709/206 |
| 5,943,399 | 8/1999 | Bannister et al. ................. 379/88.17 |
| 5,966,663 | 10/1999 | Gleason ................................ 455/466 |
| 6,014,429 | 9/1998 | LaPorta et al. .................... 379/88.15 |

Primary Examiner—Scott L. Weaver
Attorney, Agent, or Firm—Jeffrey K. Jacobs

[57] ABSTRACT

A calling communication unit (210) transmits a dispatch communication request to a communication infrastructure (202). The dispatch communication request includes at least a dispatch identification of a called communication unit (e.g.,216). In response to the dispatch communication request, the communication infrastructure generates an alert message that includes a dispatch identification of the calling communication unit and determines a telephone number associated with the called communication unit. The communication infrastructure then transmits the generated alert message to the called communication unit based on the telephone number associated with the called communication unit.

20 Claims, 8 Drawing Sheets

METHOD AND APPARATUS FOR ALERTING A COMMUNICATION UNIT IN A COMMUNICATION SYSTEM

CROSS-REFERENCE TO RELATED APPLICATION

This application is related to a co-pending application entitled "METHOD AND APPARATUS FOR FORWARDING A DISPATCH COMMUNICATION IN A COMMUNICATION SYSTEM", 09/208,680 filed on even date herewith, now U.S. Pat. No. 6,081,707 and assigned to the assignee of the instant application.

FIELD OF THE INVENTION

The present invention relates generally to communication systems and, in particular, to alerting a communication unit in a communication system.

BACKGROUND OF THE INVENTION

A wide variety of communication services are available to consumers today. To simplify a user's access to multiple services, communication systems which provide complimentary communication services are being combined and integrated. This allows a consumer to subscribe to one service provider and buy one device which meets many, if not all, of his or her communication needs.

Communication systems, such as Motorola's "iDEN" system, provide both interconnect and dispatch communication services. The interconnect services are those traditionally provided by cellular systems and include wireless telephone service, voice mail service, and paging or short message service. The dispatch services are those traditionally provided by two-way radio systems and include group call service, private call service, and call alert service.

The dispatch services allow a user to communicate in ways that are difficult or costly using today's cellular systems. The group call service, for example, enables a user to communicate with a group of people simultaneously and instantaneously. Using a cellular system, such a call could not occur instantaneously since either telephone numbers would need to be dialed for a three-way call or arrangements would need to be made to setup a conference call.

Systems which provide both interconnect and dispatch communication services have separate controllers, i.e. interconnect controllers and dispatch controllers. The need to minimize development costs and time-to-market makes such a system architecture desirable. However, in a system with independent controllers, a user of a service supported by one controller may be unable to contact a user involved in a service supported by the other controller. For example, the call alert service, a dispatch service, can alert a dispatch service user of an attempt by the call alert user to communicate; however, the call alert service is not able to alert a user involved in an interconnect service. Thus, a goal of dispatch services, to reach anyone at any time, is not realized.

In addition, a user making a telephone call (i.e., an interconnect service user) to another interconnect service user can be forwarded to voice mail, since the called user is involved in another interconnect communication. However, a user group calling or private calling (i.e., a dispatch service user) an interconnect service user cannot be forwarded to voice mail. Thus, when using dispatch services a user is unable to alert or leave a voice mail message for an interconnect service user.

Therefore, a need exists for an apparatus and method to enable a dispatch service user to alert or leave voice mail for another user concurrently involved in an interconnect communication.

DESCRIPTION OF A PREFERRED EMBODIMENT

Generally, the present invention provides an apparatus and method for alerting a communication unit and forwarding a dispatch communication in a communication system. A calling communication unit transmits a dispatch communication request to a communication infrastructure. The dispatch communication request includes at least a dispatch identification of a called communication unit. In response to the dispatch communication request, the calling communication unit may receive from the communication infrastructure a telephone number associated with a voice mail server that provides voice mail service to the called communication unit and an identification of a mailbox at the voice mail server. The calling communication unit then transmits to the voice mail server the identification of the mailbox and a voice communication. Finally, the voice mail server stores the voice communication in the mailbox. Or, in response to the dispatch communication request, the communication infrastructure may generate an alert message that includes a dispatch identification of the calling communication unit and determine a telephone number associated with the called communication unit. The communication infrastructure then transmits the generated alert message to the called communication unit based on the telephone number associated with the called communication unit.

The user of the calling communication unit is requesting that a dispatch communication be established with the called communication unit. By responding to a dispatch communication request with the telephone number associated with the called communication unit's voice mail server, the communication infrastructure provides the calling communication unit the means for establishing communication with the voice mail server. Likewise, by generating an alert message with the dispatch identification of the calling communication unit, the communication infrastructure provides the called communication unit the means for establishing a dispatch communication with the calling communication unit. So when a dispatch call cannot be established for whatever reason, the present invention enables the user of the calling communication unit to contact the user of the called communication unit via either voice mail or an alert.

Figure 1:
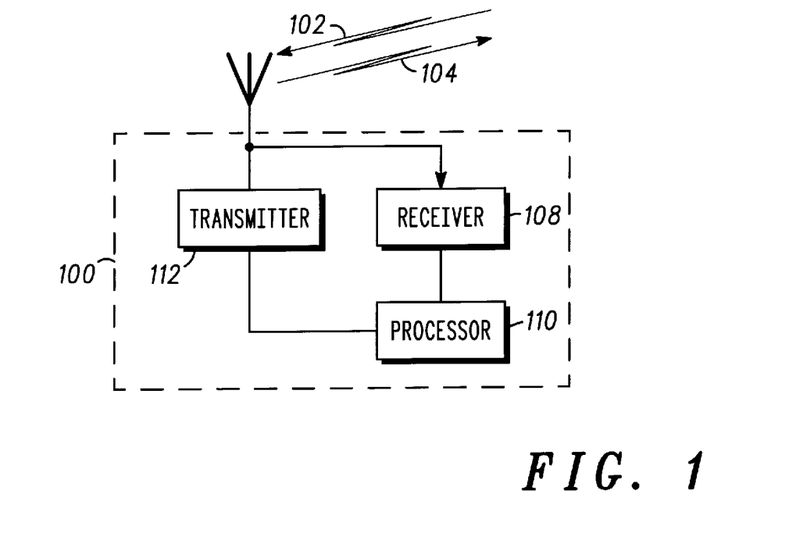
FIG. 1 is a block diagram depiction of a communication unit in accordance with a preferred embodiment of the present invention.

The present invention can be more fully understood with reference to FIGS. 1–7. FIG. 1 is a block diagram depiction of a communication unit 100 in accordance with a preferred embodiment of the present invention. The communication unit 100 comprises a receiver 108, a processor 110, and a transmitter 112. The receiver 108 preferably comprises conventional circuitry operated and controlled by routinely developed software, such as the circuitry and software used in amplifiers, demodulators, down-converters, and filters. The transmitter 112 preferably comprises conventional circuitry operated and controlled by routinely developed software, such as the circuitry and software used in amplifiers, modulators, upconverters, and filters. The processor 110 preferably comprises a microprocessor. In the preferred embodiment, the communication unit 100 is an "iDEN" radiotelephone commercially available from Motorola, Inc. of Schaumburg, Ill.

Operation of the preferred communication unit 100 in accordance with the present invention occurs substantially as follows. The transmitter 112 transmits a dispatch communication request to a communication infrastructure (not shown) via the communication resource 104. The communication resources 102, 104 are preferably radio frequency, time divisioned channels. The dispatch communication request includes a dispatch identification of a called communication unit (not shown) and requests the communication infrastructure to establish a dispatch communication between the communication unit 100 and the called communication unit.

In response to the dispatch communication request, the receiver 108 receives, via the communication resource 102, a telephone number associated with a voice mail server that provides voice mail service to the called communication unit and an identification of a mailbox at the voice mail server. The processor 110 then instructs the transmitter 112 to transmit the telephone number to the communication infrastructure to enable the communication infrastructure to establish a communication link between the communication unit and the voice mail server. Preferably, once the communication link is established, the processor 110 then instructs the transmitter 112 to transmit the identification of the voice mail server mailbox to the voice mail server.

In an alternate embodiment, the transmitter 112 transmits the dispatch communication request to the communication infrastructure as described above. In response to the dispatch communication request, however, the receiver 108 receives a telephone number associated with the called communication unit. The processor 110 may query the user of the communication unit 100 whether to generate an alert. If a query is made and the user indicates that an alert should be generated or if no query is made, the processor 110 generates an alert message including the telephone number associated with the called communication unit, a dispatch identification of the communication unit 100, and a user message. To determine the user message, the processor 110 may use a pre-selected message or a default message. Either the pre-selected message or the default message may be empty. The processor 110 may instead display a prompt, on a communication unit display, for example, and generate the user message from user keystrokes, made on a communication unit keypad, for example. Finally, the processor instructs the transmitter 112 to transmit the alert message to the called communication unit via the communication infrastructure. The user of the called communication unit, upon receiving the alert, can use the dispatch identification to initiate a dispatch communication with the communication unit 100.

Figure 2:
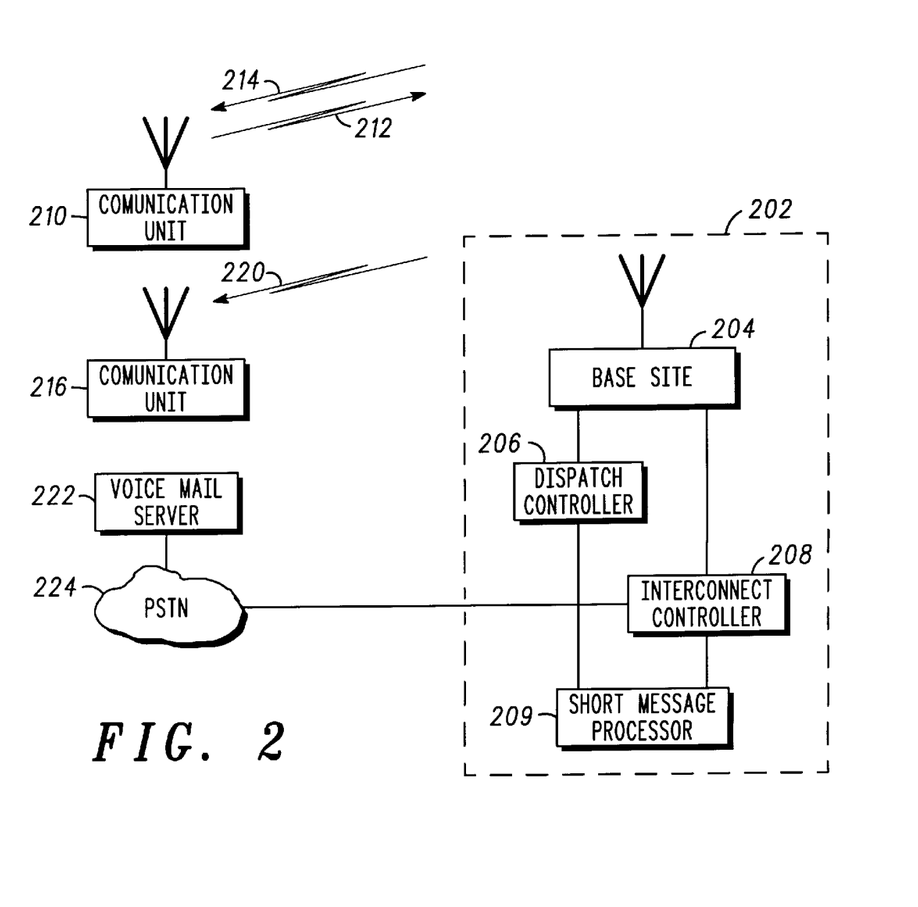
FIG. 2 is a block diagram depiction of a communication system in accordance with a preferred embodiment of the present invention.

FIG. 2 is a block diagram depiction of a communication system 200 in accordance with a preferred embodiment of the present invention. The preferable communication system 200 comprises a communication infrastructure 202, communication units 210 and 216, a voice mail server 222, and a public switched telephone network (PSTN) 224. The communication infrastructure 202 preferably comprises a base site 204, a dispatch controller 206, an interconnect controller 208, and a short message processor 209. In a preferred embodiment, the communication system 200 comprises an "iDEN" communication system that is commercially available from Motorola, Inc. of Schaumburg, Ill. Accordingly, the communication units 210, 216 preferably comprise "iDEN" radiotelephones and the communication infrastructure 202 preferably comprises "iDEN" infrastructure components. Finally, the voice mail server 222 preferably comprises a Glenayre Voice Mail System commercially available from Glenayre Electronics, Inc. of Charlotte, N.C.

Operation of the preferred communication system 200 in accordance with the present invention occurs substantially as follows. The base site 204 receives a dispatch communication request from the calling communication unit 210 via communication resource 212. The communication resources 212, 214, 220 are preferably radio frequency, time divisioned channels. Since the dispatch controller 206 controls dispatch communications for the communication infrastructure 202, the base site 204 forwards the dispatch communication request to the dispatch controller 206.

The dispatch controller 206 determines whether the dispatch communication request can be granted using call processing techniques well-known in the art. When the dispatch communication request cannot be granted, the dispatch controller 206 conveys a telephone number associated with the voice mail server 222 that provides voice mail service to the called communication unit 216 and an identification of a mailbox at the voice mail server 222 to the calling communication unit 210 via the base site 204. The base site 204 transmits the telephone number and mailbox identification to the calling communication unit 210 via the communication resource 214.

Once the calling communication unit 210 receives the telephone number and mailbox identification, the user of the calling communication unit 210 can use the telephone number and mailbox identification to call the voice mail server 222 and leave a message for the user of the called communication unit 216. To call the voice mail server 222, the calling communication unit 210 transmits the telephone number associated with the voice mail server to the base site 204. Since the interconnect controller 208 controls interconnect communications for the communication infrastructure 202, the base site 204 conveys the telephone number associated with the voice mail server to the interconnect controller 208. The interconnect controller 208, upon receiving the telephone number associated with the voice mail server 222, establishes a communication link between the calling communication unit 210 and the voice mail server 222 via the PSTN 224 using call processing techniques well-known in the art. The user of the calling communication unit 210 can then leave a voice mail message on the voice mail server 222 for the user of the called communication unit 216.

In accordance with the preferred embodiment of the present invention, the base site 204 may receive an alert request and a dispatch identification of the called communication unit 216 from the calling communication unit 210. Since the alert request is a dispatch request, the base site 204 forwards the alert request and dispatch identification to the dispatch controller 206. Obtaining the dispatch identification and alert request from the base site 204, the dispatch controller determines a telephone number associated with the called communication unit 216. Preferably, the dispatch controller has a database that links dispatch identifiers to corresponding telephone numbers. Using the dispatch identification of the called communication unit 216 the telephone number of the called communication unit 216 is extracted from the database. The dispatch controller 206 then generates an alert message that includes the dispatch identification of the calling communication unit 210.

To convey the alert message to the called communication unit 216, the dispatch controller 206 conveys the alert message and the telephone number associated with the called communication unit 216 to a short message processor 209. In the preferred embodiment, the short message processor 209 sends short text messages to communication units based on communication unit telephone numbers. Such messages may be delivered to communication units even while the communication units are involved in telephone calls. The short message processor 209 receives the alert message and the telephone number associated with the called communication unit 216 from the dispatch controller 206 and conveys the alert message to the called communication unit 216 via the base site 204 and communication resource 220. The alert message is sent based on the telephone number associated with the called communication unit 216. Upon receiving the alert message, the user of the called communication unit 216 can then use the dispatch identification contained in the alert message to initiate a dispatch communication with the calling communication unit 210.

The preferred embodiment of communication system 200, as illustrated in FIG. 2, shows the communication units 210, 216 communicating with the base site 204. In a preferred multi-cell communication system, however, a calling communication unit and a called communication unit may communicate with the communication infrastructure via different base sites that are both coupled to one short message processor. When the short message processor receives an alert message from a dispatch controller, the short message processor conveys the alert message to the called communication unit. Preferably, the short message processor conveys the alert message to the called communication unit via the base site from which the called communication unit is currently receiving infrastructure communications.

Figure 3:
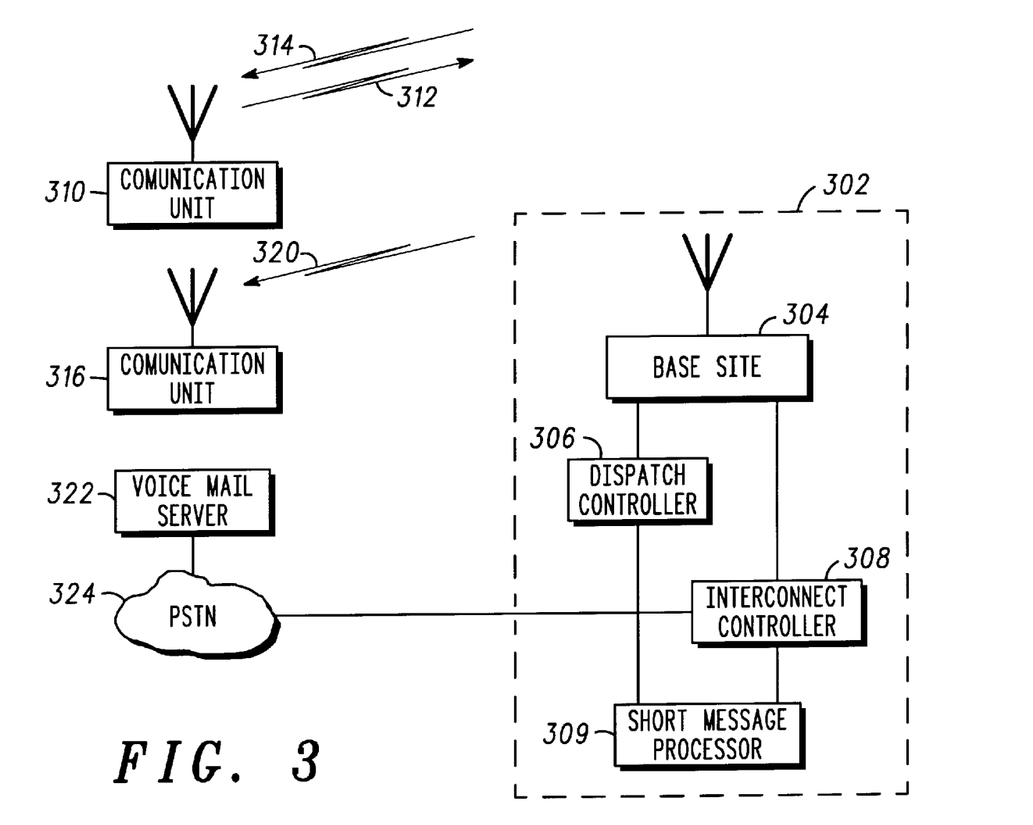
FIG. 3 is a block diagram depiction of a communication system in accordance with an alternate embodiment of the present invention.

FIG. 3 is a block diagram depiction of a communication system 300 in accordance with an alternate embodiment of the present invention. The components of the alternative communication system 300 are in most cases identical to the components of the preferred communication system 200. The alternative communication system 300 comprises a communication infrastructure 302, communication units 310 and 316, a voice mail server 322, and a public switched telephone network (PSTN) 324. The communication infrastructure 302 comprises a base site 304, a dispatch controller 306, an interconnect controller 308, and a short message processor 309. Like the preferred embodiment, the communication system 300 comprises an "iDEN" communication system that is commercially available from Motorola, Inc. of Schaumburg, Ill. Accordingly, the communication units 310, 316 comprise "iDEN" radiotelephones and the communication infrastructure 302 comprises "iDEN" infrastructure components. Also, the voice mail server 322 comprises a Glenayre Voice Mail System commercially available from Glenayre Electronics, Inc. of Charlotte, N.C.

Operation of the alternative communication system 300 occurs substantially as follows in accordance with the present invention. The base site 304 receives a dispatch communication request from the calling communication unit 310 via communication resource 312. Like the preferred embodiment, the communication resources 312, 314, 320 are radio frequency, time divisioned channels. Since the dispatch controller 306 controls dispatch communications for the communication infrastructure 302, the base site 304 forwards the dispatch communication request to the dispatch controller 306. The dispatch controller 306 obtains the dispatch communication request from the base site 304 and attempts to fulfill the request. Unlike the preferred embodiment, however, when the dispatch communication request cannot be fulfilled, the base site 304 provides a telephone number associated with the called communication unit 316 to the calling communication unit 310 via the base site 304 and communication resource 314.

With the telephone number of the called communication unit 316, the user of the calling communication unit 310 can alert the user of the called communication unit 316 of his or her failed request to establish a dispatch communication. At the calling communication unit's user's request, the calling communication unit 310 generates and transmits an alert message to the base site 304. The alert message includes the telephone number associated with the called communication unit, the dispatch identification of the calling communication unit, and a user message. The user of the calling communication unit 310 can enter or select the user message that is sent. The base site 304 receives the alert message from the calling communication unit 310 and forwards the alert message to the short message processor 309. The short message processor 309 receives from the base site 304 the alert message and then conveys the alert message to the called communication unit 316. Upon receiving the alert message, the user of the called communication unit 316 can then use the dispatch identification contained in the alert message to initiate a dispatch communication with the calling communication unit 310. Thus, a communication unit user may, alternatively, be alerted of a failed attempt by the user of another communication unit to establish communication.

When a dispatch communication request is denied by a dispatch controller, the present invention provides access to interconnect communication services (i.e., voice mail and short message alerting) supported by the communication system. Determining the telephone number associated with the called communication unit enables the called communication unit to be alerted even while involved in another communication. Providing the calling communication unit with the telephone number of a voice mail server which provides voice mail service to the called communication unit and the identification of a mailbox at the voice mail server enables the user of the calling communication unit to leave a voice mail message for the user of the called communication unit. Thus, the present invention improves dispatch services by providing the dispatch service user with the means to contact an interconnect service user.

Figure 4A:
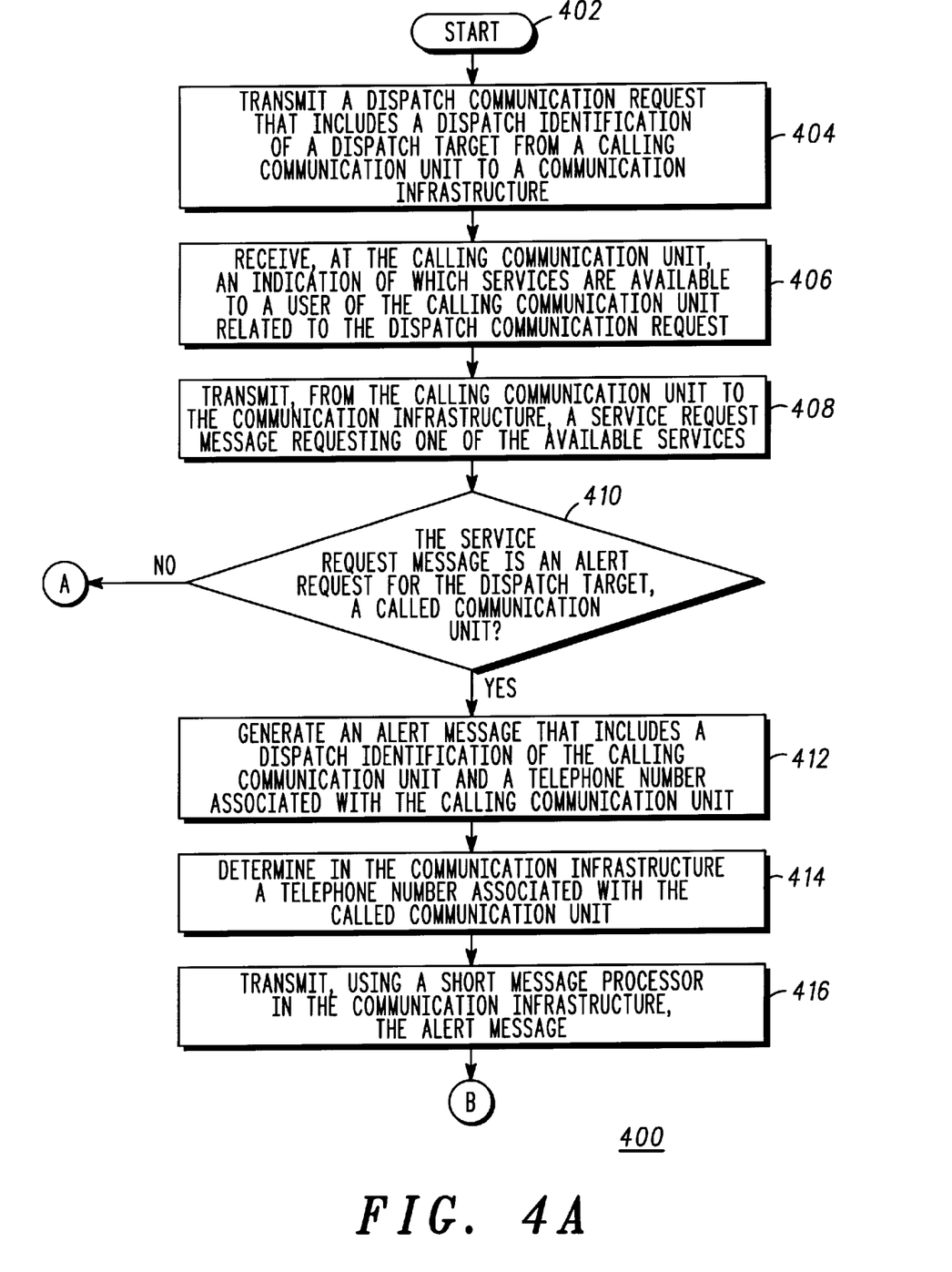
FIG. 4 is a logic flow diagram of steps executed by a communication system in accordance with a preferred embodiment of the present invention.
Figure 4B:
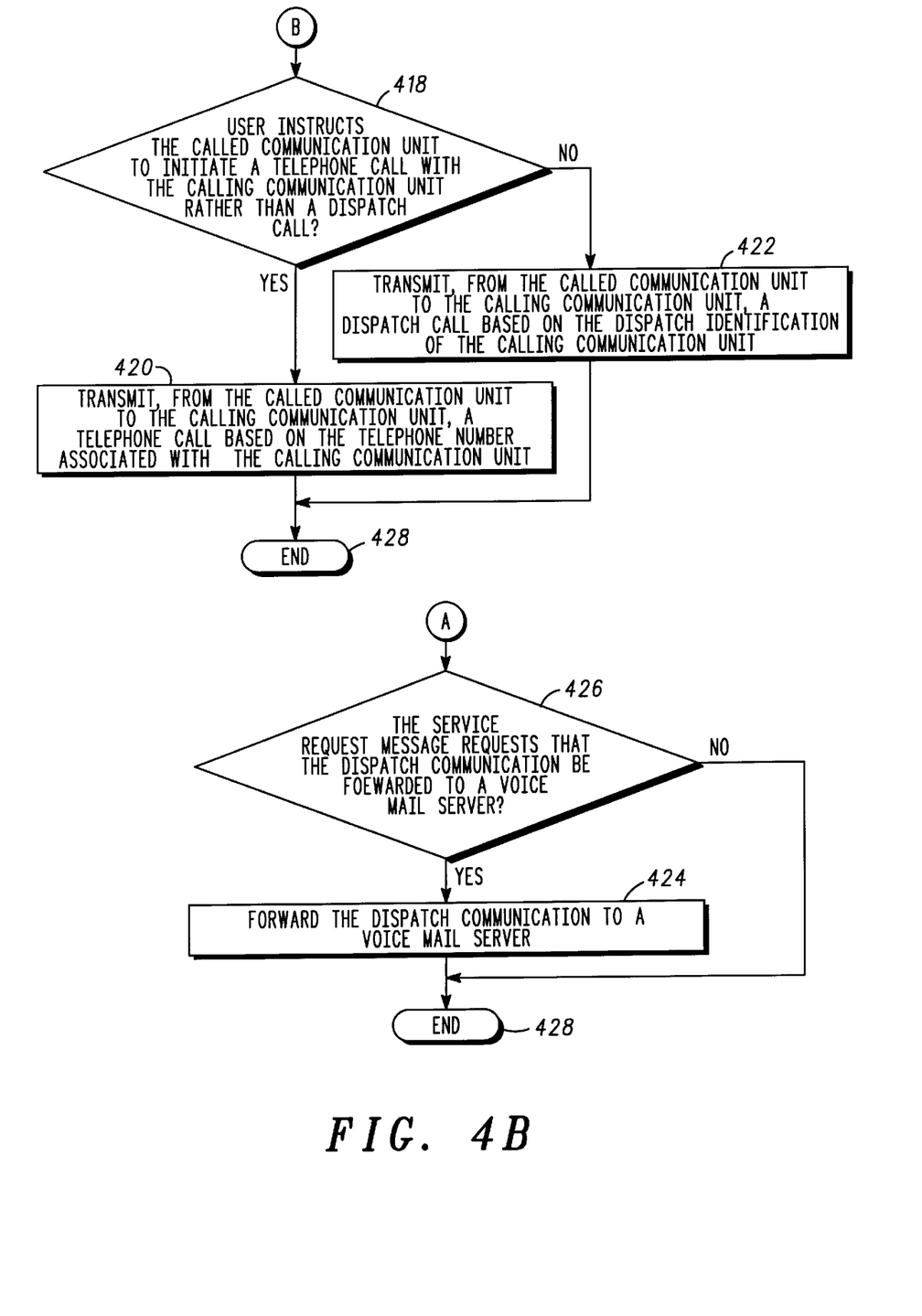

FIG. 4 is a logic flow diagram 400 of steps executed by a communication system in accordance with a preferred embodiment of the present invention. The logic flow begins (402) when a calling communication unit transmits (404) to a communication infrastructure a dispatch communication request that includes the dispatch identification of a dispatch target (i.e., a called communication unit or a group of called communication units). Upon receiving the dispatch communication request, the communication infrastructure determines whether the request can be granted.

If the request cannot be granted, the communication infrastructure preferably determines which services related to the dispatch communication request are available to the user of the calling communication unit. Specifically, can the user of the calling communication unit alert the dispatch target, and can the dispatch communication request be forwarded to a voice mail server? The communication infrastructure determines whether the calling communication unit is allowed to receive forwarded dispatch communications, whether the dispatch target allows dispatch communications to be forwarded to a voice mail server, and whether the dispatch target is capable of and allowed to receive an alert message. In the preferred embodiment, the communication infrastructure maintains databases that store the capabilities and purchased options of each communication unit and group of communication units. If the dispatch target is capable of and allowed to receive an alert message, then the alert service is available. If the dispatch target allows dispatch communications to be forwarded to a voice mail server and the calling communication unit is allowed to receive forwarded dispatch communications, then the voice mail forwarding service is available. Upon determining which services related to the dispatch communication request are available, the communication infrastructure transmits an indication of the available services to the calling communication unit.

The calling communication unit receives (406) the indication of which services related to the dispatch communication request are available. Preferably, the user of the calling communication unit selects one of the available services. When the alert service is selected, the calling communication unit transmits (408) a service request message requesting that the dispatch target (i.e., the called communication unit, since groups of communication units are not alerted in the preferred embodiment) be alerted of an attempt by the calling communication unit to communicate with the dispatch target.

The communication infrastructure receives the service request message and determines (410) that the service request message is an alert request. The communication infrastructure then generates (412) an alert message that preferably includes the dispatch identification of the calling communication unit and a telephone number associated with the calling communication unit. The communication infrastructure determines (414) a telephone number associated with the called communication unit and transmits (416) the alert message to the called communication unit based on the telephone number associated with the called communication unit. Preferably, the alert message comprises a short text message and is transmitted to the called communication unit by a short message processor in the communication infrastructure. The transmission of the alert message to the called communication unit is discussed further with reference to FIG. 5 below.

Upon receiving the preferable alert message, the user of the called communication unit can initiate either a telephone call or a dispatch call to the calling communication unit using the contents of the alert message. If (418) the user instructs the called communication unit to initiate a telephone call, the called communication unit transmits (420) to the calling communication unit a telephone call based on the telephone number associated with the calling communication unit. If (418) the user, instead, instructs the called communication unit to initiate a dispatch call, the called communication unit transmits (422) to the calling communication unit a dispatch call based on the dispatch identification of the calling communication unit.

When the user of calling communication unit selects the voice mail forwarding service instead of the alert service, the calling communication unit transmits a service request message that requests the dispatch communication request to be forwarded to the voice mail server. The communication infrastructure receives the service request message and determines (426) that the service request message is a voice mail forwarding request rather than an alert request, the communication infrastructure forwards (424) the dispatch communication to a voice mail server. The forwarding of the dispatch communication to a voice mail server is discussed further with reference to FIG. 6 below. Upon transmitting (420) a telephone call, transmitting (422) a dispatch call, or forwarding (424) the dispatch communication to a voice mail server, logic flow 400 ends (428).

Figure 5:
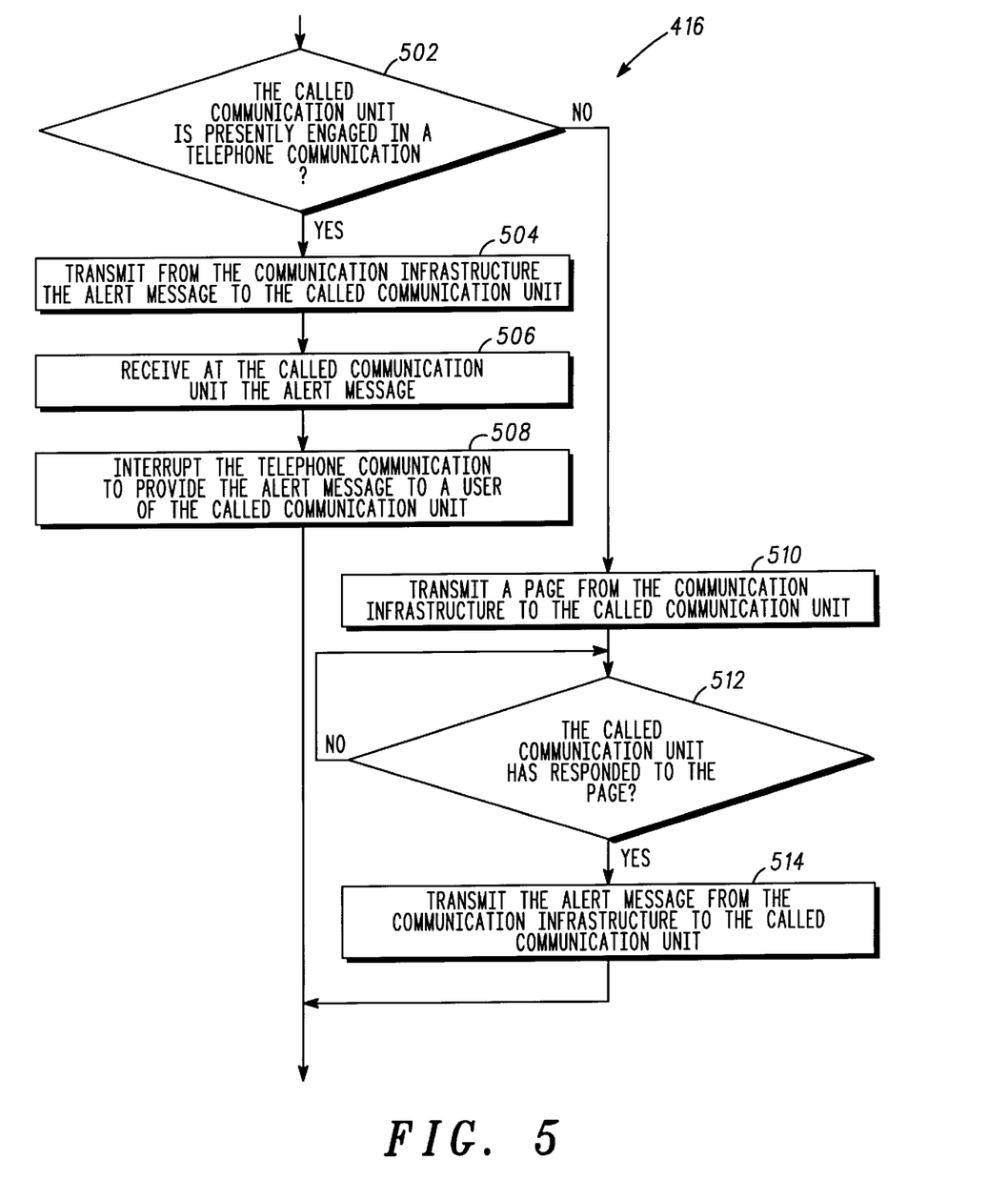
FIG. 5 is a logic flow diagram of steps executed by a communication system to transmit an alert message in accordance with a preferred embodiment of the present invention.

FIG. 5 is a logic flow diagram 416 of steps executed by a communication system to transmit an alert message in accordance with a preferred embodiment of the present invention. In the preferred embodiment, a communication infrastructure first determines whether a called communication unit is presently engaged in a telephone communication. If (502) the called communication unit is presently engaged in a telephone communication, the communication infrastructure transmits (504) the alert message to the called communication unit. The called communication unit receives (506) the alert message and then interrupts the telephone communication to provide the alert message to the user of the called communication unit. Preferably, the interruption of the telephone communication involves notifying the user audibly while continuing the telephone communication.

If (502) the user is not presently engaged in a telephone communication, the communication infrastructure preferably transmits (510) a page to the called communication unit and then determines whether the called communication unit responded to the page. When (512) the called communication unit has responded to the page, the communication infrastructure transmits (514) the alert message to the called communication unit. The page is transmitted before the alert message to establish the ability of the called communication unit to receive the alert message.

Figure 6:
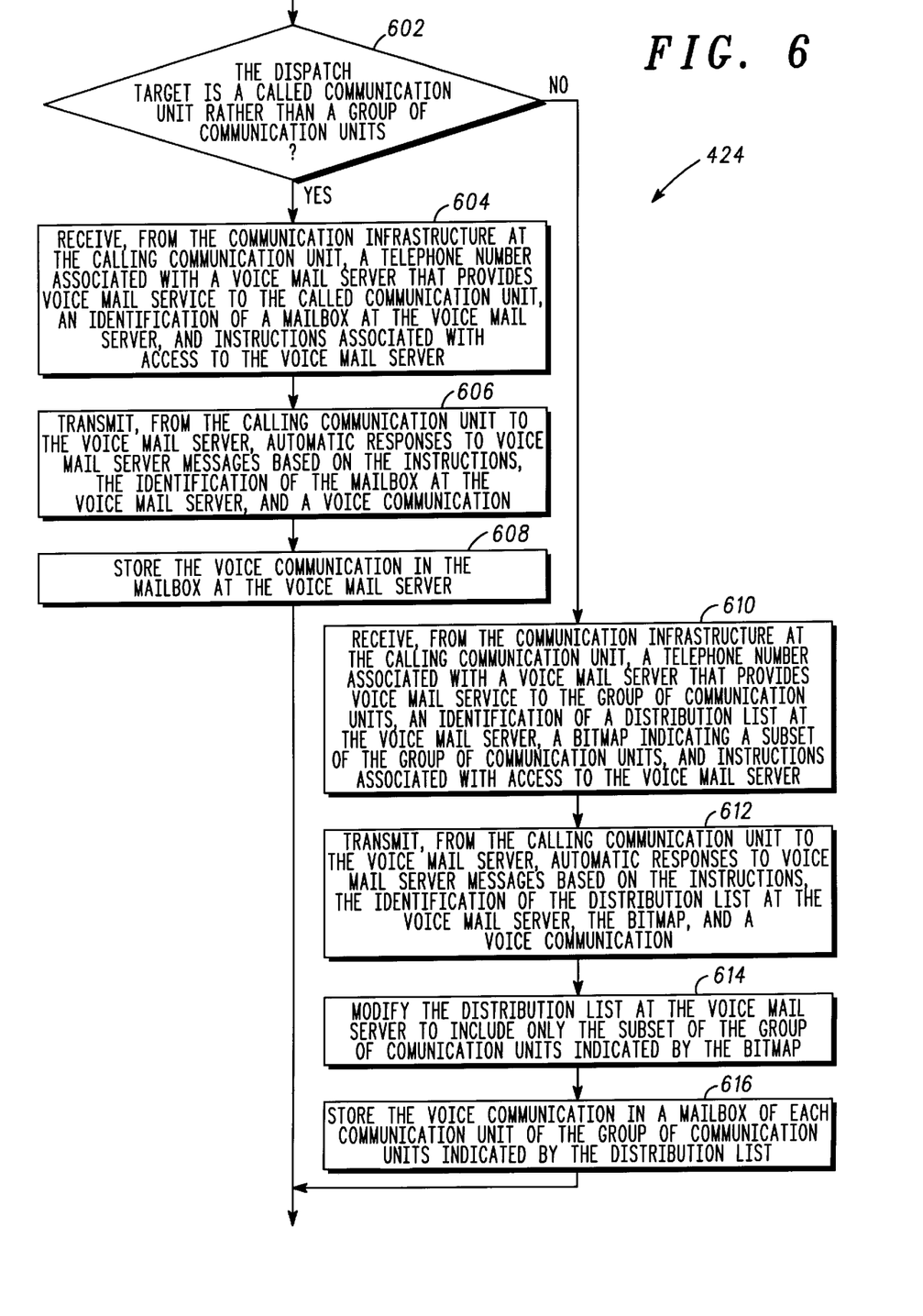
FIG. 6 is a logic flow diagram of steps executed by a communication system to forward a dispatch communication to a voice mail server in accordance with a preferred embodiment of the present invention.

FIG. 6 is a logic flow diagram of steps executed by a communication system to forward a dispatch communication to a voice mail server in accordance with a preferred embodiment of the present invention. In the preferred embodiment, the communication infrastructure determines whether the dispatch target of the dispatch communication is a single communication unit or a group of communication units. If (602) the dispatch target is a single called communication unit, then the calling communication unit receives (604) from the communication infrastructure a telephone number associated with a voice mail server that provides voice mail service to the called communication unit and an identification of a mailbox at the voice mail server. Preferably, the calling communication unit also receives instructions associated with access to the voice mail server. The instructions enable the calling communication unit to automatically respond to the voice mail server messages in order to leave a voice mail message for a user of the called communication unit.

To leave such a voice mail message, the user of the calling communication unit instructs the calling communication unit to call the voice mail server using the telephone number received from the communication infrastructure. The calling communication unit transmits (606) to the voice mail server via the communication infrastructure, the identification of the mailbox at the voice mail server, a voice communication, and, preferably, automatic responses to voice mail server messages based on the instructions. In the preferred embodiment, at least a portion of the voice mail server messages are muted as the calling communication unit automatically responds to the voice mail server messages. Finally, upon receiving the voice communication, the voice mail server stores (608) the voice communication in the mailbox.

If (602) the dispatch target is a group of called communication units instead of a single called communication unit, then the calling communication unit receives (610) from the communication infrastructure a telephone number associated with a voice mail server that provides voice mail service to the group of communication units and an identification of a distribution list at the voice mail server associated with the group of communication units. Preferably, the calling communication unit also receives from the communication infrastructure instructions associated with access to the voice mail server and a bitmap indicating a subset of the group of communication units. In the preferred embodiment, a dispatch communication may occur without including all of the members of the called group. For example, group members involved in interconnect calls, at the time the dispatch communication request was made, would not have been included in the dispatch communication. The bitmap indicates, then, the members of the group of communication units which are determined to have not been included in the dispatch communication.

To leave a voice mail message for the communication units which were not part of the dispatch communication but part of the dispatch target group, the user of the calling communication unit instructs the calling communication unit to call the voice mail server using the telephone number received from the communication infrastructure. The calling communication unit transmits (612) to the voice mail server via the communication infrastructure, the identification of the distribution list, the bitmap, a voice communication, and, preferably, automatic responses to voice mail server messages based on the instructions. In the preferred embodiment, at least a portion of the voice mail server messages are muted as the calling communication unit automatically responds to the voice mail server messages. Upon receiving the bitmap and identification of the distribution list, the voice mail server modifies (614) the distribution list to include only the subset of the group of communication units indicated by the bitmap. The voice mail server then stores (616) the voice communication in the mailbox of each communication unit of the group of communication units indicated by the distribution list.

Figure 7A:
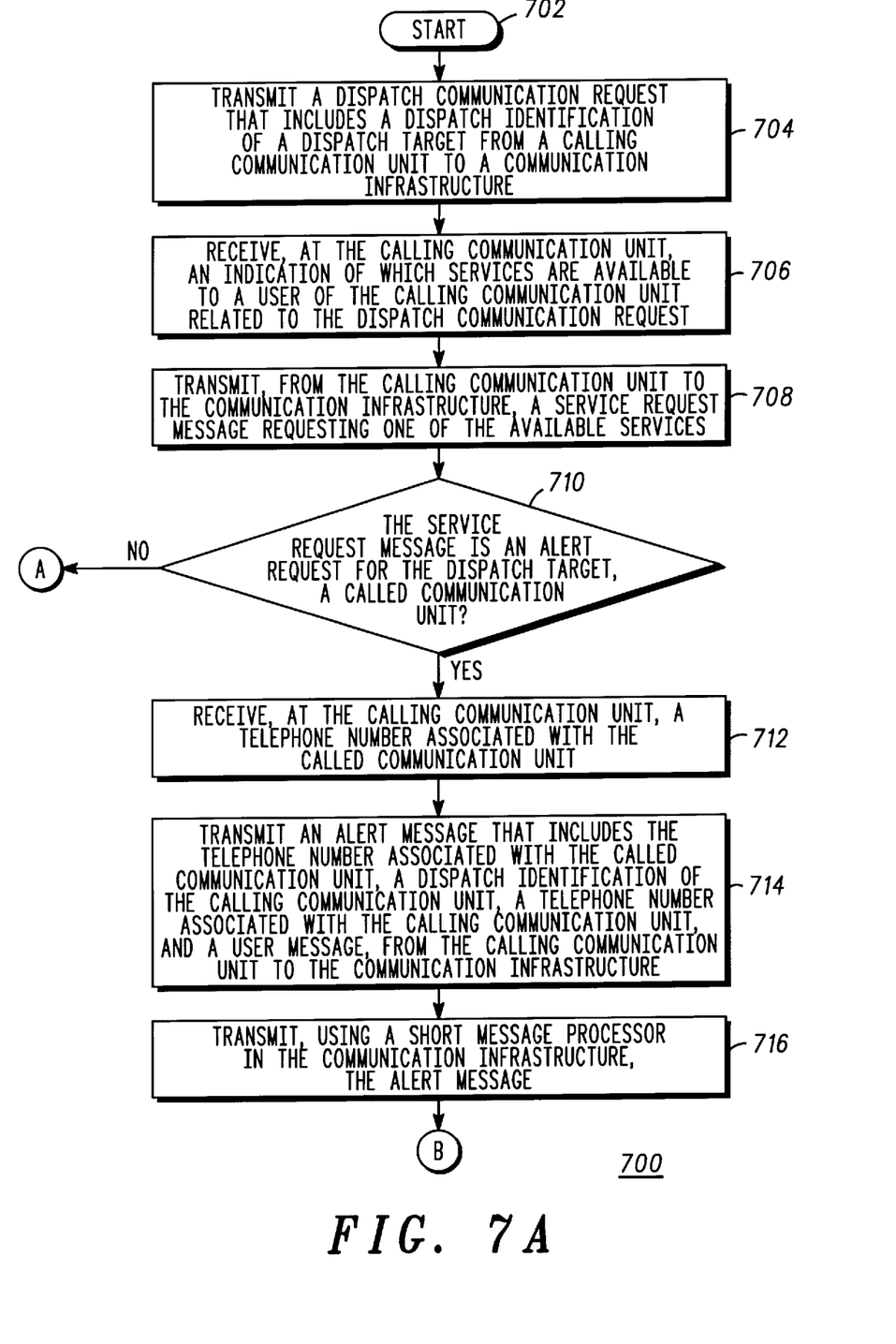
FIG. 7 is a logic flow diagram of steps executed by a communication system in accordance with an alternate embodiment of the present invention.
Figure 7B:
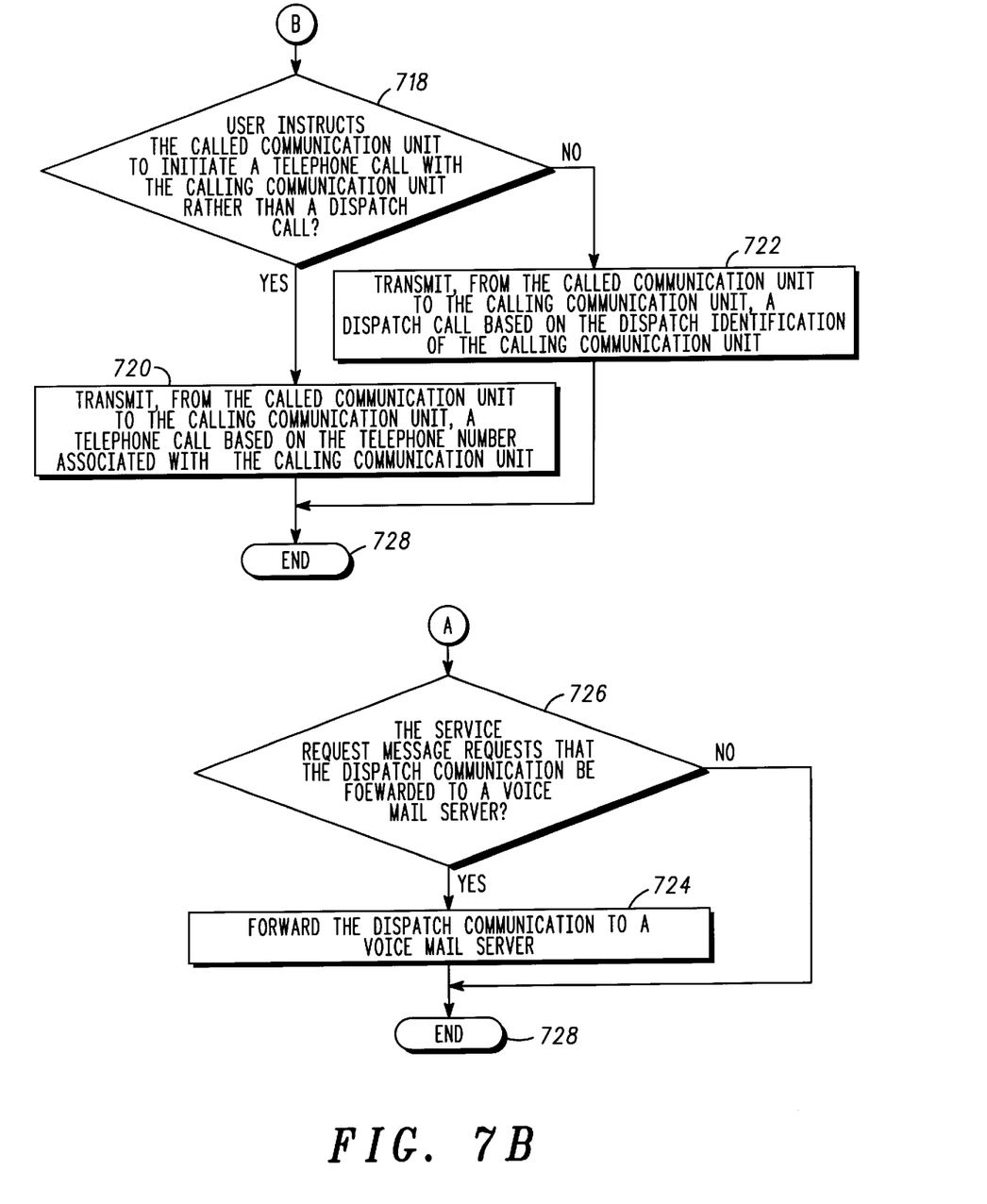

FIG. 7 is a logic flow diagram 700 of steps executed by a communication system in accordance with an alternate embodiment of the present invention. The steps of logic flow diagram 700 are similar to the steps of logic flow diagram 400. Specifically, the alternate embodiment steps 702, 704, 706, 708, and 710 are the same as the preferred embodiment steps 402, 404, 406, 408, and 410, respectively. Additionally, the alternate embodiment steps 716, 718, 720, 722, 724, 726, and 728 are the same as the preferred embodiment steps 416, 418, 420, 422, 424, 426, and 428 respectively. However, the alternate embodiment steps 712 and 714 differ from the preferred embodiment as follows.

In the preferred embodiment, when the calling communication unit transmits an alert request to the communication infrastructure, the communication infrastructure generates (412) an alert message and determines (414) the telephone number associated with the called communication unit. Alternatively, the telephone number associated with the called communication unit may be determined by the communication infrastructure and then sent to the calling communication unit. The calling communication unit receives (712) the telephone number associated with the called communication unit and, when instructed by the user of the calling communication unit to alert the called communication unit, generates an alert message. The alert message includes the telephone number associated with the called communication unit, the dispatch identification of the calling communication unit, the telephone number associated with the calling communication unit, and a user message. The user message may be either entered or selected by the user. The alert message is then transmitted (714) from the calling communication unit to the communication infrastructure.

A first alternate embodiment of the present invention was discussed above with reference to FIG. 7. In a second alternate embodiment, the communication infrastructure sends the calling communication unit a telephone number associated with the called communication unit without first sending an indication of which services are available and receiving a service request message in turn. In a third alternate embodiment, the communication infrastructure also sends the calling communication unit a telephone number associated with a voice mail server that provides voice mail service to the called communication unit without first sending an indication of which services are available and receiving a service request message in turn. The user of the calling communication unit in the second and third alternate embodiments may then decide whether to alert the called communication unit or leave voice mail. Finally, in a forth alternate embodiment, the communication infrastructure, unable to grant a dispatch communication request, generates an alert message and transmits the alert message to the called communication unit automatically. Thus, the user of the called communication unit is alerted of the failed dispatch communication attempt promptly and without additional effort by the user of the calling communication unit.

The present invention encompasses a method and apparatus for alerting a communication unit and forwarding a dispatch communication in a communication system. With this invention, a dispatch service user can alert a communication unit involved in an interconnect communication of the dispatch service user's attempt to communicate. In addition, the dispatch service user can leave a voice mail message for the user of the communication unit. The present invention provides access to interconnect services following failed dispatch communication requests, and thus, improves the system's dispatch communication services.

While the present invention has been particularly shown and described with reference to particular embodiments thereof, it will be understood by those skilled in the art that various changes in form and details may be made therein without departing from the spirit and scope of the present invention.

We claim:

1. A method for a communication infrastructure in a communication system to alert a called communication unit of an attempt by a calling communication unit to communicate with the called communication unit, the method comprising the steps of:

receiving from the calling communication unit a dispatch communication request that includes a dispatch identification of the called communication unit;

generating an alert message that includes a dispatch identification of the calling communication unit;

determining a telephone number associated with the called communication unit; and transmitting the alert message to the called communication unit based on the telephone number associated with the called communication unit.

2. The method of claim 1, wherein the alert message comprises a short text message, wherein the communication infrastructure includes a short message processor, and wherein the step of transmitting the alert message to the called communication unit comprises the step of transmitting, by the short message processor, the alert message to the called communication unit.

3. The method of claim 1, wherein the step of transmitting the alert message to the called communication unit comprises the steps of:

determining whether the called communication unit is presently engaged in a telephone communication;

when the called communication unit is presently engaged in a telephone communication,
transmitting the alert message to the called communication unit;

when the called communication unit is not presently engaged in a telephone communication,
transmitting a page to the called communication unit;
determining whether a response to the page has been received from the called communication unit; and
when a response to the page has been received from the called communication unit, transmitting the alert message to the called communication unit.

4. The method of claim 1, wherein the alert message further includes a telephone number associated with the calling communication unit.

5. The method of claim 1, further comprising the step of determining, prior to transmitting the alert message, whether the called communication unit is capable of receiving the alert message.

6. A method for a calling communication unit in a communication system to alert a called communication unit of an attempt to communicate, the method comprising the steps of:

transmitting to a communication infrastructure a dispatch communication request that includes a dispatch identification of the called communication unit;

receiving an indication of which services are available to a user of the calling communication unit related to the dispatch communication request; and when the indication indicates that alert service is available to the user of the calling communication unit, transmitting an alert request message to the communication infrastructure, the alert request message requesting that the called communication unit be alerted of an attempt by the calling communication unit to communicate with the called communication unit.

7. A method for a communication infrastructure in a communication system to alert a called communication unit of an attempt by a calling communication unit to communicate with the called communication unit, the method comprising the steps of:

receiving from the calling communication unit a dispatch communication request that includes a dispatch identification of the called communication unit;

transmitting to the calling communication unit, in response the dispatch communication request, a telephone number associated with the called communication unit;

receiving from the calling communication unit an alert message and the telephone number associated with the called communication unit, the alert message including a dispatch identification of the calling communication unit and a user message; and transmitting the alert message to the called communication unit based on the telephone number associated with the called communication unit.

8. The method of claim 7, wherein the alert message comprises a short text message, wherein the communication infrastructure includes a short message processor, and wherein the step of transmitting the alert message to the called communication unit comprises the step of transmitting, by the short message processor, the alert message to the called communication unit.

9. The method of claim 7, wherein the step of transmitting the alert message to the called communication unit comprises the steps of:

determining whether the called communication unit is presently engaged in a telephone communication;

when the called communication unit is presently engaged in a telephone communication,
transmitting the alert message to the called communication unit;

when the called communication unit is not presently engaged in a telephone communication,
transmitting a page to the called communication unit;
determining whether a response to the page has been received from the called communication unit; and
when the response to the page has been received from the called communication unit, transmitting the alert message to the called communication unit.

10. The method of claim 7, wherein the alert message further includes a telephone number associated with the calling communication unit.

11. The method of claim 7, further comprising the step of determining, prior to the step of transmitting the alert message, whether the called communication unit is capable of receiving the alert message.

12. The method of claim 7, further comprising the step of transmitting a telephone number associated with a voice mail server that provides voice mail service to the called communication unit and an identification of a mailbox at the voice mail server associated with the called communication unit.

13. A method for a calling communication unit in a communication system to alert a called communication unit of an attempt to communicate, the method comprising the steps of:

transmitting to a communication infrastructure a dispatch communication request that includes a dispatch identification of the called communication unit;

receiving from the communication infrastructure a telephone number associated with the called communication unit in response to the dispatch communication request; and transmitting an alert message and the telephone number associated with the called communication unit to the communication infrastructure, the alert message including a dispatch identification of the calling communication unit and a user message.

14. The method of claim 13, further comprising the steps of:

prior to the step of receiving the telephone number associated with the called communication unit,
receiving an indication of which services are available to a user of the calling communication unit related to the dispatch communication request; and when the indication indicates that alert service is available to the user of the calling communication unit, transmitting a service request message to the communication infrastructure, the service request message requesting that the called communication unit be alerted of an attempt by the calling communication unit to communicate with the called communication unit.

15. The method of claim 13, wherein the step of receiving further comprises the step of receiving a telephone number associated with a voice mail server that provides voice mail service to the called communication unit and an identification of a mailbox at the voice mail server associated with the called communication unit.

16. A communication unit comprising:
    a transmitter that transmits a dispatch communication request to a communication infrastructure, the dispatch communication request including a dispatch identification of a called communication unit;
    a receiver that receives, responsive to transmission of the dispatch communication request, a telephone number associated with the called communication unit; and
    a processor, coupled to the receiver and the transmitter, that instructs the transmitter to transmit an alert message to the called communication unit via the communication infrastructure, wherein the alert message includes the telephone number associated with the called communication unit, a dispatch identification of the communication unit, and a user message.

17. A communication infrastructure comprising:
    a base site that receives a dispatch communication request from a calling communication unit, the dispatch communication request including a dispatch identification of a called communication unit;
    a dispatch controller, coupled to the base site, that obtains the dispatch communication request from the base site, and when the dispatch communication request cannot be fulfilled, provides a telephone number associated with the called communication unit to the calling communication unit via the base site; and
    a short message processor, coupled to the base site, that receives an alert message and the telephone number associated with the called communication unit from the base site when the dispatch communication request cannot be fulfilled, the alert message including a dispatch identification of the calling communication unit and a user message, and that conveys the alert message to the called communication unit based on the telephone number associated with the called communication unit.

18. The communication infrastructure of claim 17, wherein the base site receives the alert message from the calling communication unit.

19. The communication infrastructure of claim 17, further comprising a voice mail server, coupled to the base site, that provides voice mail service to the called communication unit, wherein the base site further receives from the dispatch controller a telephone number associated with the voice mail server and an identification of a mailbox at the voice mail server associated with the called communication unit and transmits the telephone number associated with the voice mail server and the identification of the mailbox to the calling communication unit.

20. A communication infrastructure comprising:
    a base site that receives an alert request and a dispatch identification of a called communication unit from a calling communication unit;
    a dispatch controller, coupled to the base site, that obtains the dispatch identification and the alert request from the base site, determines a telephone number associated with the called communication unit, and generates an alert message that includes a dispatch identification of the calling communication unit; and
    a short message processor, coupled to the dispatch controller, that receives the alert message and the telephone number associated with the called communication unit from the dispatch controller and conveys the alert message to the called communication unit based on the telephone number associated with the called communication unit.

* * * * *